United States Patent [19] [11] Patent Number: 5,031,357
Macbeth [45] Date of Patent: Jul. 16, 1991

[54] TREE INJECTION CLOSED SYSTEM

[76] Inventor: John C. Macbeth, P.O. Box 365, Springfield, Pa. 19064

[21] Appl. No.: 347,394

[22] Filed: May 4, 1989

[51] Int. Cl.$^5$ ............................................. A01G 29/00
[52] U.S. Cl. ..................................................... 47/57.5
[58] Field of Search ......................................... 47/57.5

[56] References Cited

U.S. PATENT DOCUMENTS

| | | | |
|---|---|---|---|
| 1,684,864 | 8/1928 | Hansen | 47/57.5 |
| 1,756,453 | 4/1930 | Davey | 47/57.5 |
| 2,413,303 | 1/1944 | Folkman . | |
| 2,712,202 | 6/1954 | Hosler et al. . | |
| 3,295,254 | 1/1967 | Schoonman | 47/57.5 |
| 3,706,305 | 12/1972 | Berger et al. . | |
| 3,789,844 | 2/1974 | Burges . | |
| 3,834,075 | 9/1974 | Nix | 47/57.5 |
| 3,992,813 | 11/1976 | Freshel | 47/57.5 |
| 4,011,685 | 3/1977 | Boyd | 47/57.5 |
| 4,103,456 | 8/1978 | Hendrixson et al. . | |
| 4,112,617 | 9/1978 | Purviance | 47/57.5 |
| 4,144,673 | 3/1979 | Quast | 47/57.5 |
| 4,615,468 | 10/1986 | Gay . | |

FOREIGN PATENT DOCUMENTS

| | | | |
|---|---|---|---|
| 2509123 | 1/1983 | France | 47/57.5 |
| 268073 | 7/1970 | U.S.S.R. | 47/57.5 |
| 677364 | 8/1952 | United Kingdom | 47/57.5 |

OTHER PUBLICATIONS

"Tree Growth Regulator Delivery Systems", by TIS Enterprises.
"Colt 75", Tree Injection System, by TIS Enterprises.

Primary Examiner—Richard E. Chilcot, Jr.
Assistant Examiner—Joanne C. Downs
Attorney, Agent, or Firm—Connolly and Hutz

[57] ABSTRACT

A tree injection closed system functions to dispense treatment fluid such as tree growth regulators (TGR) or retardants into the cambium layer of a tree to slow the growth thereof. Other treatment fluid include nutriments and fungicides, for example. The system comprises an injector having a tubular body section for holding a charge of treatment fluid, and an injector tip in fluid communication with the tubular body section functions to dispense the fluid into the cambium layer of the tree being treated. A manual pump in fluid communication with a supply of treatment fluid may be used to charge the injector with the fluid. Alternatively, the treatment fluid supply may be pressurized and the fluid directly charged into the injector. Another alternative comprises a syringe which functions to fill the injector with a pre-packaged dose of treatment fluid.

14 Claims, 9 Drawing Sheets

TREE INJECTION CLOSED SYSTEM

BACKGROUND OF THE INVENTION

The present invention relates to a tree injection closed system for injecting fluid chemicals into living trees, and more particularly to a closed system for injecting tree growth regulators or retardants into the cambium layer of a tree trunk in a manner that ensures excellent distribution of the regulator throughout the branches of the tree. Other treatment fluids include nutriments and fungicides, for example.

Prior to the present invention various arrangements have been proposed for introducing liquid substances into living trees for a variety of purposes. One such purpose concerns the growth regulation of trees in order to lessen periodic pruning or trimming, particularly with trees requiring maintenance because of interference with power and telephone lines as well as other utilities. Without tree growth regulation of some form, trimming of trees is often required at one to four year intervals. However, efficient distribution of growth regulators or retardants throughout the branch structure of the tree substantially decreases the need for such trimming. Often trimming is only required every three to six years in those cases where tree growth is properly slowed. The necessity of costly trimming procedures is thereby dramatically diminished.

In addition to insuring excellent distribution of growth regulators throughout the tree, any injection system must also be safe and easy to use. Simplicity is of key importance. Proper dosage amounts and rates of introduction are fundamental to achieving beneficial results. Eliminating the need for costly compressors and other bulky or cumbersome paraphernalia renders any injection procedure more cost effective.

SUMMARY OF THE INVENTION

Accordingly, it is an object of the present invention to provide a tree injection closed system which is easy to use and which efficiently and effectively dispenses chemical fluids such as growth regulators or retardants as well as other treatment fluids such as nutriments and fungicides, for example.

Another object of the present invention is a tree injection closed system which dispenses a premeasured dosage of growth regulator or retardant or other treatment fluids in a manner characterized by simplicity and effectiveness.

Still another object of the present invention is a tree injection system which ensures proper dosage amounts regardless of tree diameter and species.

Another object of the present invention is a tree injection closed system which eliminates the need for compressors and/or outside power sources, such system being portable, light in weight and extremely easy to manipulate in the field.

In accordance with the present invention, a tree injection closed system functions to dispense treatment fluids such as tree growth regulators or retardants into the cambium layer of a tree to slow the growth thereof. The system comprises an injector having a tubular body section with inlet and outlet ends and at least some portions of which are transparent for viewing the interior thereof. An inlet end cap is secured to the tubular body, and a quick connect-disconnect shut-off fitting is attached to the inlet end cap for charging the tubular body with treatment fluid. An outlet end cap is secured to the tubular body, and an injector tip is attached to the outlet end cap in fluid communication with the interior of the tubular body. A valve mechanism adjacent the injector tip is used to control the discharge of treatment fluid therefrom.

A manual pump having inlet and outlet ends may be utilized to charge the injector with treatment fluid. A distributor device is connected to the inlet end of the pump, and a treatment fluid supply is connected to the distributor. The manual pump has a quick connect-disconnect fitting at the outlet end thereof arranged for releasable attachment to the quick connect-disconnect shut-off fitting at the inlet end cap of the injector. A quick connect-disconnect shut-off fitting at the inlet end of the pump is arranged for releasable attachment to the distributor and its associated treatment fluid supply so that treatment fluid is drawn into the pump and discharged therefrom into the injector. After charging the injector with treatment fluid and disconnection of the injector from the manual pump, the interior is pressurized to facilitate treatment fluid flow through the injector tip.

The distributor also includes a quick connect-disconnect fitting for direct connection to the quick connect-disconnect shut-off fitting at the inlet end of the injector. The treatment fluid supply connected to the distributor is pressurized via a suitable fitting on the distributor so that treatment fluid flows through the distributor directly into the injector charging the interior thereof with treatment fluid.

A syringe may be used for charging the injector with treatment fluid, and such syringe preferably includes a hollow chamber having inlet and outlet ends. A quick connect-disconnect fitting at the outlet end is arranged for releasable attachment to the quick connect-disconnect shut-off fitting at the inlet end cap of the injector. A plunger is slidably mounted within the hollow chamber of the syringe for charging treatment fluid from the syringe into the injector.

Preferably a sealed flexible tube with a premeasured does of treatment fluid is arranged to fit within the hollow chamber of the syringe. A conduit at the inner end of the chamber through which the fluid flows has an inner end which punctures the flexible tube and thereby establishes treatment fluid flow to the injector when the plunger of the syringe is depressed into the hollow chamber.

BRIEF DESCRIPTION OF THE DRAWING

Novel features and advantages of the present invention in addition to those noted above will become apparent to those of ordinary skill in the art from a reading of the following detailed description in conjunction with the accompanying drawing wherein similar reference characters refer to similar parts and in which.

DETAILED DESCRIPTION

Figure 1:
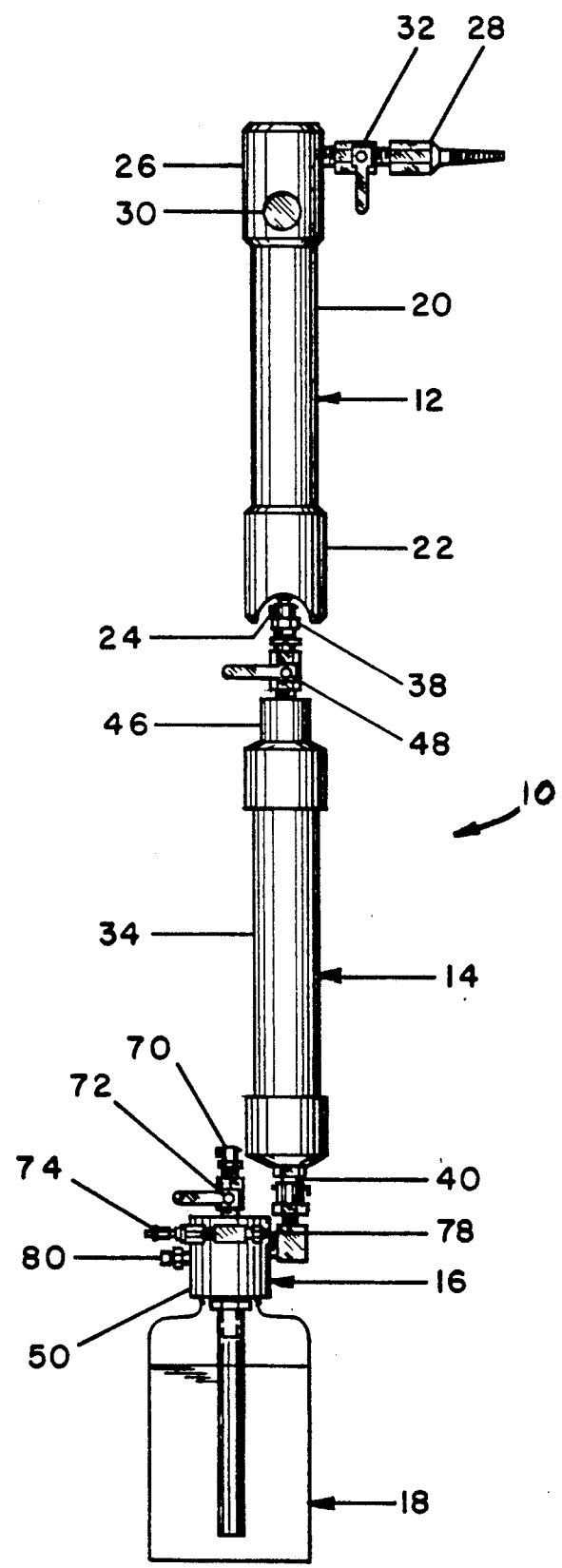
FIG. 1 is a side elevational view of a tree injection closed system, according to the present invention.
Figure 2:
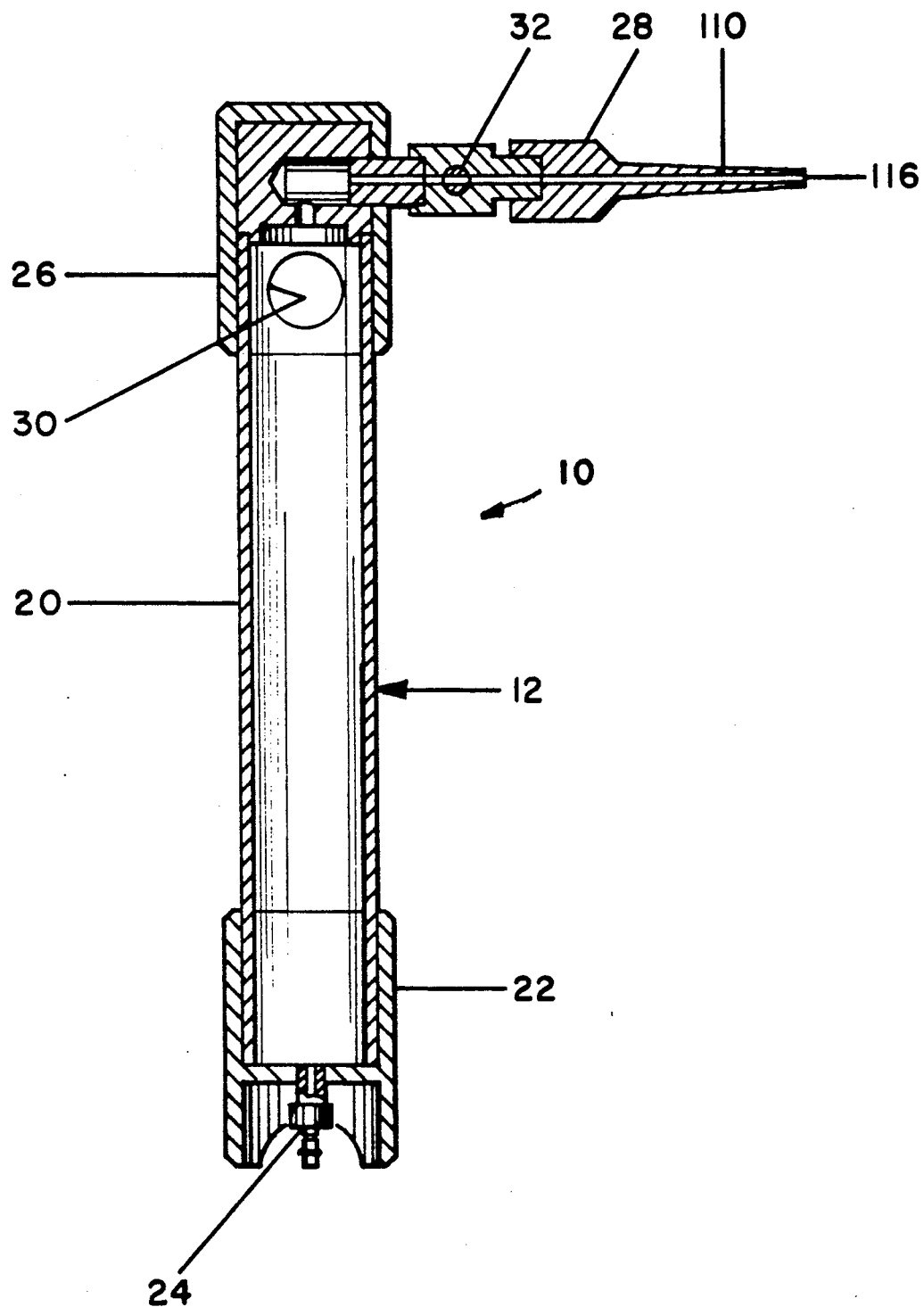
FIG. 2 is an enlarged longitudinal sectional view of the injector of the tree injection closed system shown in FIG. 1.

Referring in more particularity to the drawing, the various figures illustrate a tree injection closed system 10 for dispensing treatment fluid such as tree growth regulators or retardants into the cambium layer of a tree to slow the growth thereof. Retardants of this type slow the growth of trees so the trimming schedule can be extended from once every one to four years to once every three to six years, for example. While growth retardants are often intended for use by utility companies on trees near power and telephone lines, they are useful on any trees where growth regulation is desired. Other treatment fluids include nutriments and fungicides, for example.

As shown in FIG. 1, the tree injection closed system 10 of the present invention includes an injector 12, a manual pump 14, a distributor device 16 and a treatment fluid supply in the form of a tank 18. These components function in combination to charge the injector 12 with treatment fluid from the tank 18.

Injector 12 of tree injection closed system 10 includes a tubular body section 20 with inlet and outlet ends and at least some portions of which are transparent for viewing the interior thereof. In the preferred embodiment, tubular body section 20 is manufactured from transparent material so that the entire portion thereof may be used for viewing purposes. An inlet end cap 22 is secured to the tubular body at the inlet end thereof, and a quick connect-disconnect shut-off fitting 24 is attached to inlet end cap 22 for charging tubular body 20 with treatment fluid, as explained more fully below. Fitting 24 is a well known type and functions to quickly connect to a cooperating companion fitting. When so connected, a fluid flow passageway is established, and when disconnection is made, fitting 24 has a shut-off feature which closes that passageway. An outlet end cap 26 is secured to tubular body 20 at its outlet end, and an injector tip 28 is attached to the outlet end cap in fluid communication with the interior of the tubular body, as clearly shown in FIG. 1. Outlet end cap 26 has opposed side openings 30 for viewing the interior of the tubular body. A valve mechanism 32 is located adjacent injector tip 28 for controlling the discharge of treatment fluid therefrom.

Figure 3:
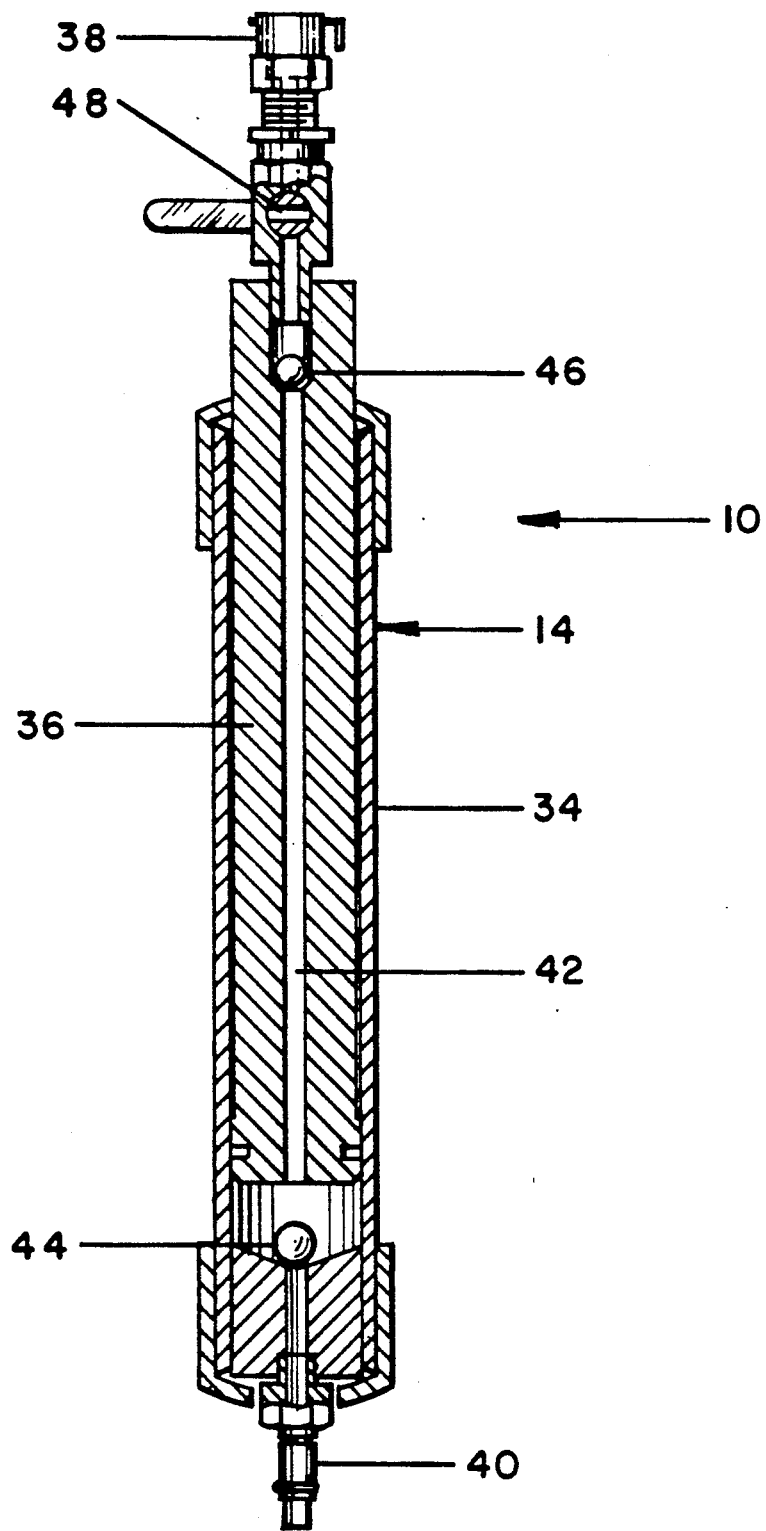
FIG. 3 is an enlarged longitudinal sectional view of the manual pump of the tree injection closed system shown in FIG. 1.

Manual pump 14 of tree injection closed system 10 is best illustrated in FIG. 3. In the preferred embodiment, the manual pump comprises a cylindrical body 34 and a cooperating plunger 36 slidably mounted within the cylindrical body. The pump includes a quick connect-disconnect fitting 38 at the outlet end thereof arranged for releasable attachment to the quick connect-disconnect shut-off fitting 24 at the inlet end of injector 12. Additionally, pump 14 has a quick connect-disconnect shut-off fitting 40 at the inlet end thereof for connection to the distributor 16, as explained more fully below.

A fluid flow passageway 42 extends through plunger 36 up to fitting 38. A first ball valve 44 at the inlet end of the pump is arranged to allow treatment fluid to enter cylindrical body 34 via fitting 40 when the plunger 36 is withdrawn, and to prevent treatment fluid from escaping when the plunger is pushed into the cylindrical body. A second ball valve 46 at the outlet end of the pump is disposed within the fluid flow passageway 42 to prevent fluid flow through the passageway when the plunger is withdrawn. A valve 48 at the outlet end of the pump controls the flow of treatment fluid therefrom. Operation of the pump and charging of the injector 12 with treatment fluid from the pump is described more fully below.

Figure 4:
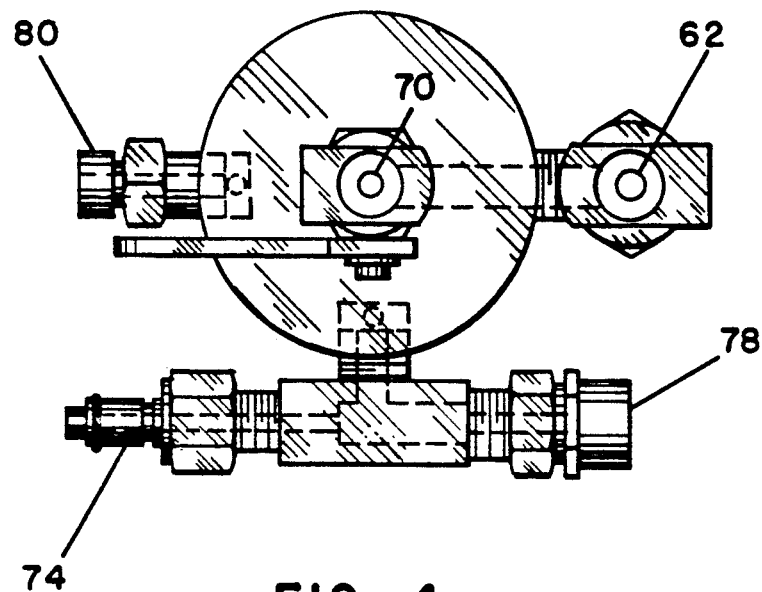
FIG. 4 is an enlarged top plan view of the distributor of the tree injection closed system shown in FIG. 1.
Figure 5:
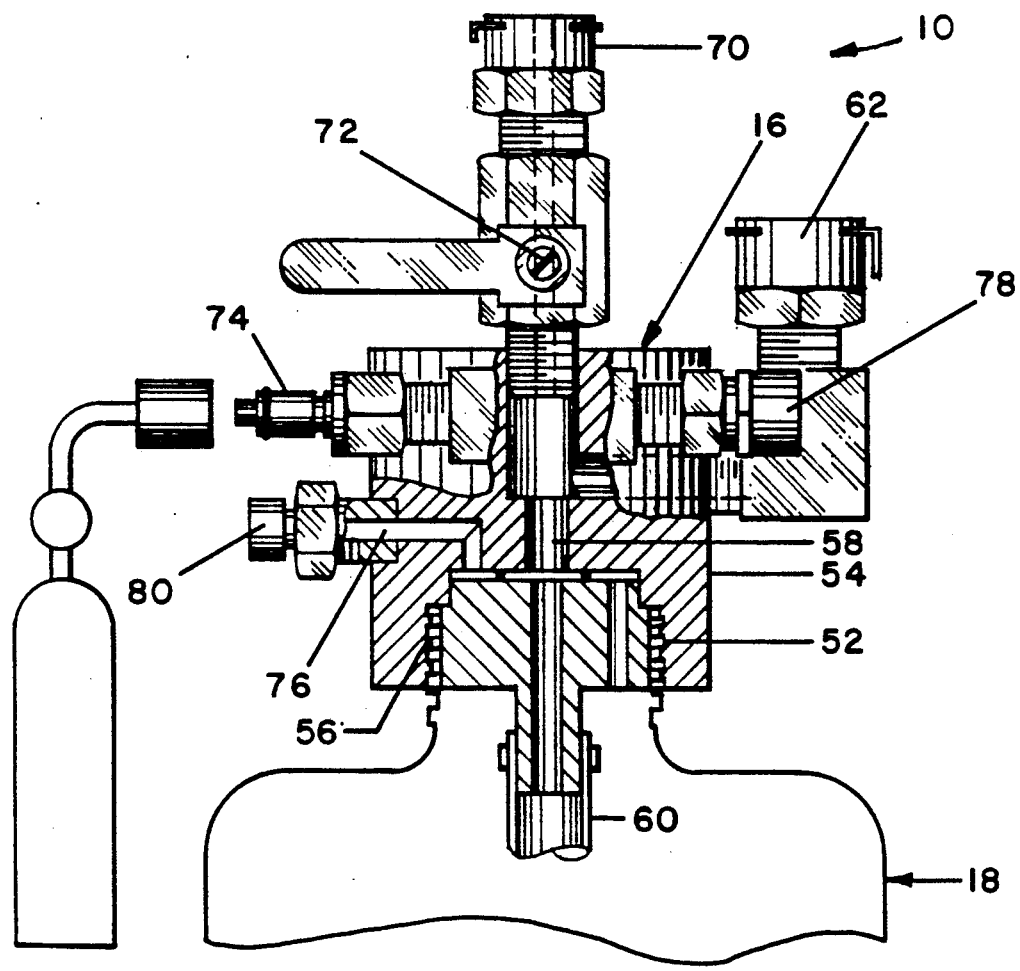
FIG. 5 is an enlarged side elevational view of the distributor with portions broken away to show interior detail.
Figure 6:
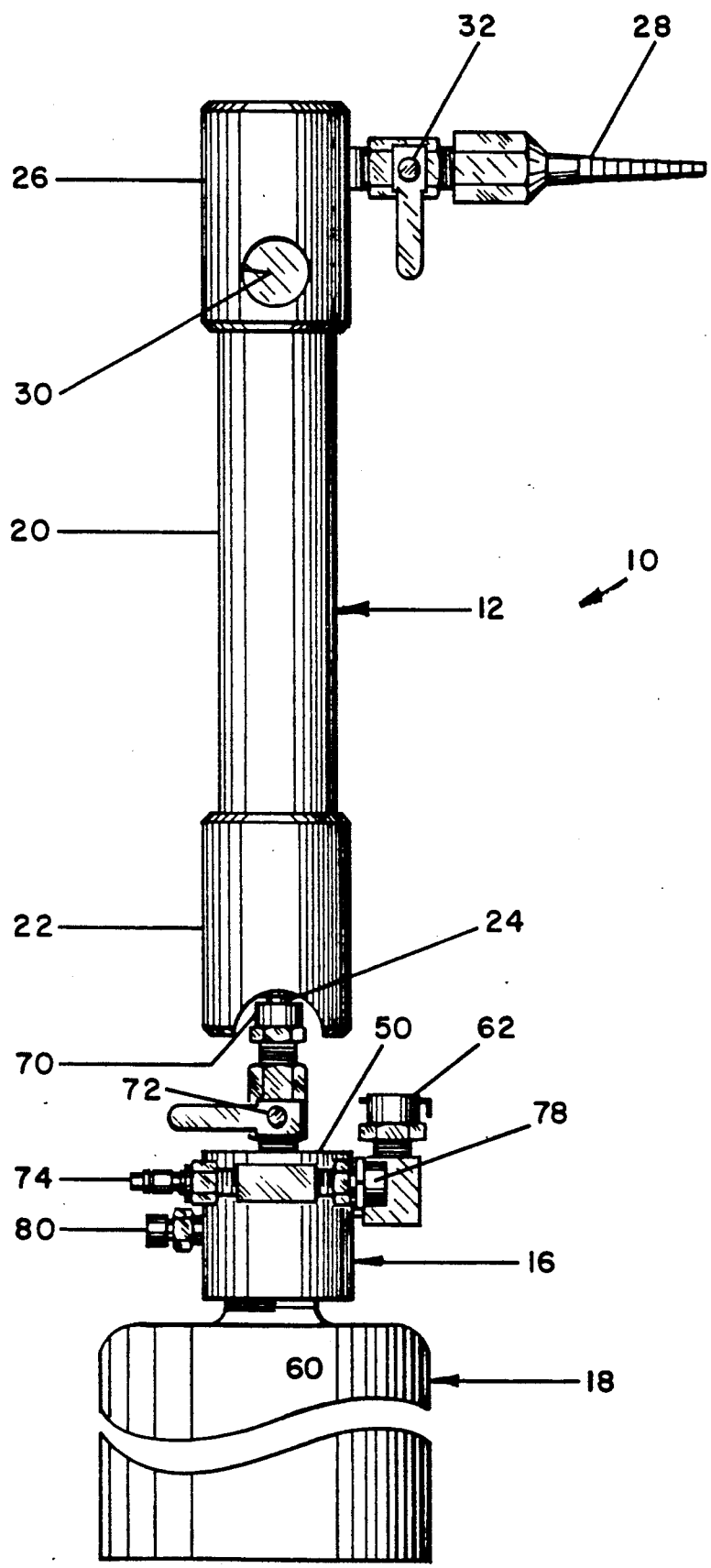
FIG. 6 is a side elevation view of the injector directly connected to the distributor and its associated treatment fluid supply.

Distributor 16 is shown in detail in FIGS. 4 and 5. In the preferred embodiment the distributor comprises a housing 50 with internal porting therein and various fittings connected to that porting. Housing 50 is connected to the fluid treatment supply 18, preferably with an airtight connection so that the fluid treatment tank may be pressurized. In the preferred embodiment, treatment fluid tank 18 includes a spout 52 with a continuous thread 54 on the exterior thereof. A cooperating internal thread 56 within the housing 50 of distributor 16 is arranged to receive threaded spout 54 in fluid type relationship therewith.

A central passageway 58 extends through housing 50 of distributor 16 into treatment fluid tank 18. A flexible tube 60 is employed to extend passageway 58 to the bottom of tank 18. One of the exit ends of passageway 58 includes a quick connect-disconnect shut-off fitting 62 for releasable connection to fitting 40 of manual pump 14.

Utilizing manual pump 34, injector 12 is charged with treatment fluid from tank 18 in the following manner. First, injector 12 is positioned as shown in FIG. 1, and inlet fitting 24 is releasably connected to outlet fitting 38 on the manual pump. Inlet fitting 40 of the manual pump is then releasably connected to outlet fitting 62 on the distributor 16. With valve 48 in its closed position, plunger 36 of the manual pump is withdrawn from the cylindrical body 34, and treatment fluid from tank 18 flows through flexible tube 60 and passageway 58 into the cylindrical body of the pump. Valve 48 is then shifted to its open position and the plunger 38 is depressed into the cylindrical body whereby treatment fluid flows through passageway 42 past ball valve 46 and into the tubular body 20 of the injector. Valve 32 of the injector is open during this process to allow air from the tubular body to exit via the injector tip 28. After the tubular body 20 is filled with treatment fluid, valve 32 is closed and the injector is disconnected from the manual pump. Suitable pressurizing means may then be connected to fitting 24 to pressurize the interior thereof.

The injector is then ready for use in introducing treatment fluid into the tree being treated.

An alternative to use of the manual pump 14 comprises directly connecting the injector 12 to the housing 50 of distributor 16. In this regard, passageway 58 includes a second exit opening and a quick connect-disconnect fitting 70 is located at that exit. A valve 72 in passageway 58 controls the flow of treatment fluid to the fitting 70 from the tank 18.

To accomplish direct charging of the injector 12 from the distributor 16, housing 50 includes a suitable fitting 74 and internal porting 76 for pressurizing the interior of fluid treatment tank 18. Also, safety valve 78 is included whereby pressurization above a predetermined amount, 20 psi, for example, is prevented. Finally, a pressure relief valve 80 is suitably connected to the distributor housing 50 and the internal porting therein to relieve pressure in the treatment fluid tank 18, when desired.

In direct charging of the injector 12 from distributor 16, valve 72 is closed, and the tank 18 is pressurized via fitting 74 and internal porting 72 which opens into the tank. Next, the quick connect-disconnect shut-off fitting 24 at the inlet of injector 12 is releasably connected to quick connect-disconnect fitting 70 of distributor 16. Valve 72 on the distributor is then moved to its open position, and pressurized treatment fluid flows into the tubular body 20 of the injector 12. Injector valve 32 is open during this process which allows air to escape. Once the desired level of treatment fluid flows into the injector, distributor valve 72 is closed thereby terminating further fluid flow into the injector. Injector valve 32 is then closed, and the injector is disconnected from the distributor. After pressurization, as described above, the injector is ready for use.

Figure 7:
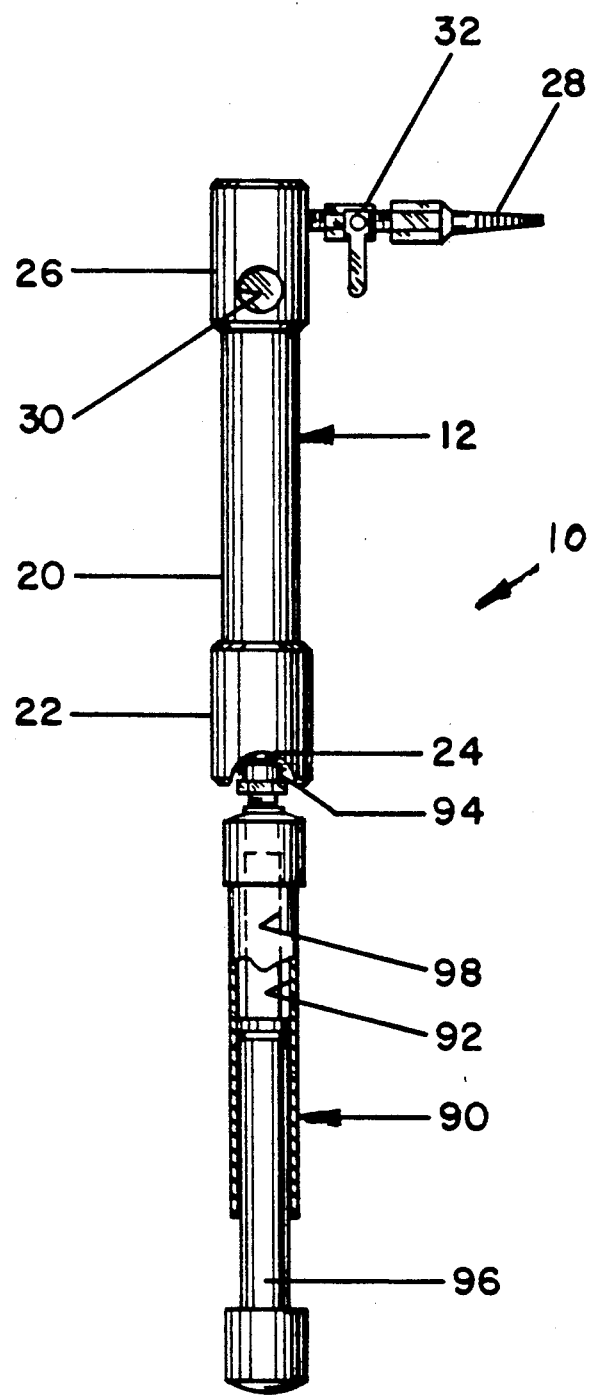
FIG. 7 is a side elevational view of the injector and a syringe for filling the injector with treatment fluid from a premeasured bag, portions of the syringe being broken away to show interior details thereof.
Figure 8:
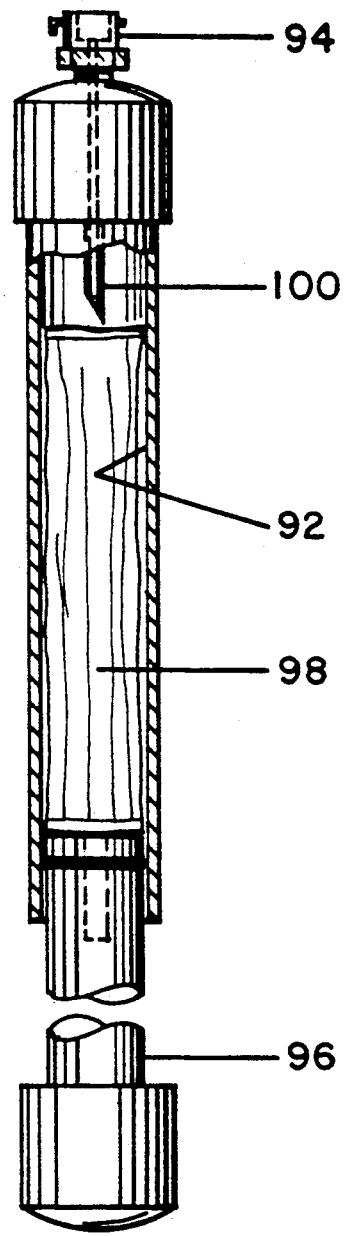
FIG. 8 is an enlarged side elevational view of the syringe shown in the assembly of FIG. 7, with portions broken away to illustrate interior details at the start of the filling procedure.
Figure 9:
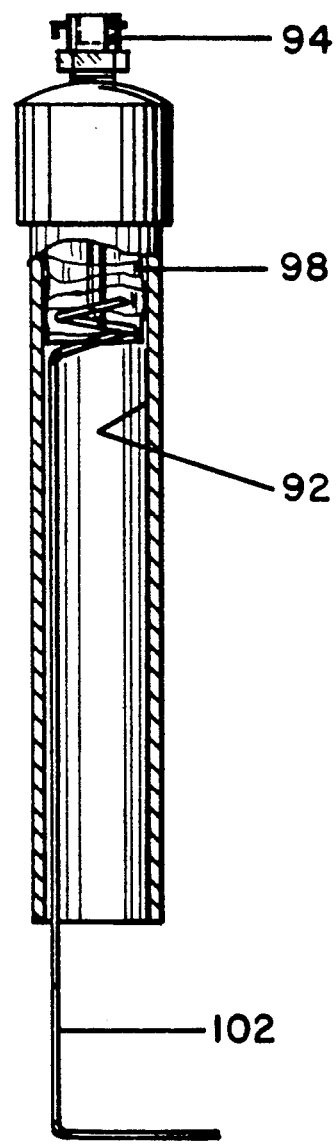
FIG. 9 is a view of the syringe similar to FIG. 8 but with the plunger removed and an extractor inserted therein for removal of the spent bag of treatment fluid.

FIGS. 7-9 illustrate an alternate construction for charging injector 12 with treatment fluid. Specifically a syringe device 90 is utilized, the syringe including a cylinder having a hollow chamber 92 with inlet and outlet ends. The outlet end of syringe 90 includes a quick connect-disconnect fitting for releasable attachment to the quick connect-disconnect shut-off fitting 38 of injector 12. A plunger 96 is slidably mounted within hollow chamber 92 for discharging treatment fluid from the syringe into the injector 20, as explained more fully below.

A sealed flexible tube 98 with a premeasured dose of treatment fluid therein is arranged to fit within the hollow chamber 92 of syringe 90, as shown best in FIG. 8. A conduit 100 at the outlet end of the syringe has a sharpened inner end which functions to puncture flexible tube 98 to thereby establish treatment fluid flow to injector 12 when plunger 96 is depressed into hollow chamber 92.

In use, fitting 94 of the syringe and fitting 24 of the injector are interconnected. Bag 98 comprising a premeasured dose of treatment fluid, 75 milliliters, for example, is then positioned within hollow chamber 92, and plunger 96 is then reinserted into the chamber. With the injector 12 positioned as shown in FIG. 7, injector valve 32 is opened, and the plunger is depressed. Bag 98 is punctured by conduit 100 and continued depression of the plunger forces the treatment fluid into the tubular body 20 of the injector. After the desired amount of treatment fluid is introduced into the injector, the syringe is disconnected, and valve 32 is closed. After pressurization, as described below, the injector is ready for use. The plunger is then withdrawn from the hollow chamber of the syringe, and a bag extractor 102 is utilized to remove the spent flexible tube in the manner shown in FIG. 9.

Figure 10:
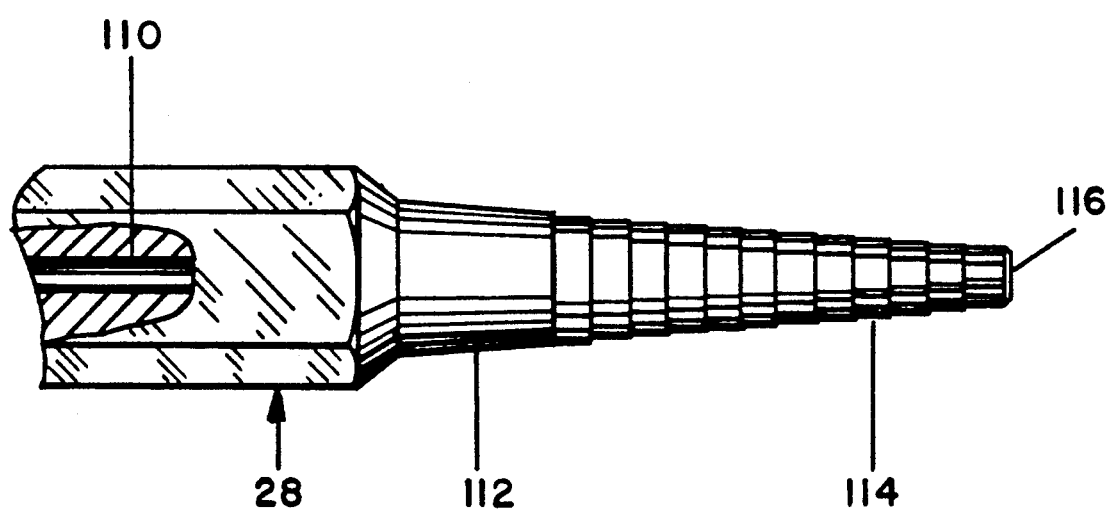
FIG. 10 is an enlarged side elevational view of the tree engaging tip of the injector.

As best shown in FIG. 10, injector tip 28 has an internal passageway 110 and a tapered step-shaped exterior 112 formed by a series of cylindrical surfaces 114, the diameters of which increase in a direction away from an injector orifice 116. Each cylindrical surface 114 has a common longitudinal axis which coincides with the internal passageway of the injector tip. This tapered step-shaped exterior provides excellent sealing interaction between the injector and an opening in a tree when treatment fluid is dispensed into the cambium layer thereof, as described below.

All of the individual components of tree injection system 10 may be fabricated from any suitable materials including metals and/or thermoplastics. Techniques known in the art may be used to fabricate these components.

Figure 11:
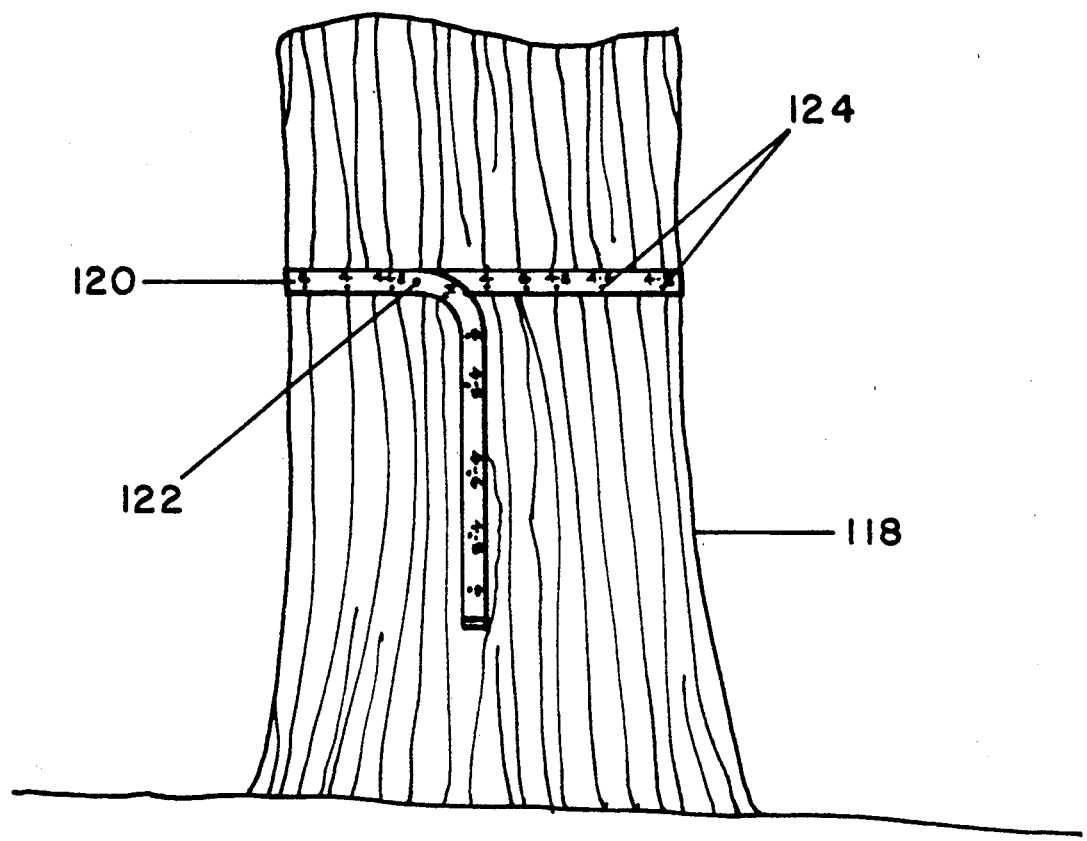
FIG. 11 is a side elevational view of a tree trunk and a measuring tape for determining the number and location of injection sites.
Figure 12:
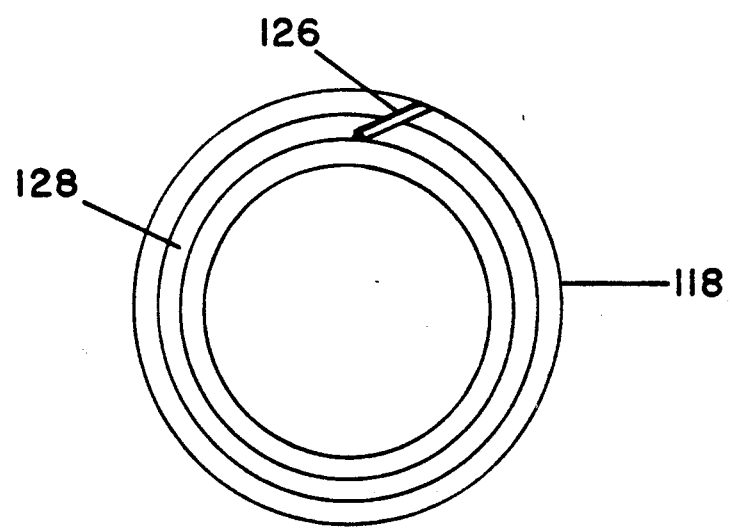
FIG. 12 is a cross-sectional view of a tree trunk illustrating the direction of a drill hole for receiving the injector of the tree injection closed system of the present invention.

The location and number of injection sites around the circumference of a tree trunk 118, such as illustrated in FIGS. 11 and 12, is determined by wrapping a site numbered measuring tape 120 around the trunk. One end of the tape is fasstened to the tree trunk by a long pin 122, and after wrapping the tape around the trunk, the free end thereof is simply draped over the long pin. The tape is usually placed around the tree at about 24 inches above ground level, and thereafter the operator simply marks the injection sites on the tree corresponding to indications 124 on the tape. The indicia on the tape locates the sites at 4, 6 or 8 inch spacings. Holes 126 are then drilled into the tree trunk at each site, preferably 7/32 inch in diameter. Each hole is generally horizontal and tangentially oriented relative the tree circumference, as shown best in FIG. 12. Injector tip 28 is then slightly tapped into one of the holes after which valve 32 is moved to an open position whereby treatment fluid is dispensed into the cambium layer 128 of the tree.

What is claimed is:

1. A tree injection closed system for dispensing treatment fluid into the cambium layer of a tree comprising an injector having a tubular body section with inlet and outlet ends and at least some portions of which are transparent for viewing the interior thereof, an inlet end cap secured to the tubular body, quick connect-disconnect shut-off means attached to the inlet end cap for charging the tubular body with treatment fluid, an outlet end cap secured to the tubular body, an injector tip attached to the outlet end cap in fluid communication with the interior of the tubular body, and a valve mechanism adjacent the injector tip for controlling the discharge of treatment fluid therefrom.

2. A tree injection closed system as in claim 1 including a manual pump having inlet and outlet ends, distributor means connected to the inlet end of the pump, and a treatment fluid supply connected to the distributor means, the manual pump further having quick connect-disconnect means at the outlet end constructed and arranged for releasable attachment to the quick connect-disconnect shut-off means at the inlet end cap of the injector, quick connect-disconnect shut-off means at the inlet end of the pump constructed and arranged for releasable attachment to the distributor means and its associated treatment fluid supply whereby treatment fluid is drawn into the pump and discharged therefrom into the injector.

3. A tree injection closed system as in claim 2 wherein the manual pump includes a cylindrical body and a plunger slidably mounted therein having a fluid flow passageway, first ball valve means at the inlet end of the pump arranged to allow treatment fluid to enter the cylindrical body when the plunger is withdrawn and to prevent treatment fluid from escaping when the plunger is pushed into the cylindrical body, and second ball valve means at the outlet end of the pump disposed within the fluid flow passageway in the plunger arranged to prevent fluid flow through the passageway when the plunger is withdrawn.

4. A tree injection closed system as in claim 2 including means to pressure the interior of the injector after charging with treatment fluid and disconnection from the manual pump.

5. A tree injection closed system as in claim 1 including distributor means connected to the quick connect-disconnect shut-off means at the inlet end of the injector, a treatment fluid supply in fluid communication with the distributor means, and pressurizing means connected to the distributor means for pressurizing the treatment fluid supply whereby treatment fluid flows through the distributor means and into the injector for charging the interior thereof with treatment fluid.

6. A tree injection closed system as in claim 5 wherein the distributor means includes quick connect-disconnect shut-off means for connection to the pressurizing means, an internal passageway extending from the quick connect-disconnect shut-off means to the interior of the treatment fluid supply, safety valve means connected to the internal passageway for preventing pressurization over a predetermined amount, and pressure relief means for relieving the pressure in the fluid treatment supply when desired.

7. A tree injection closed system as in claim 5 wherein the treatment fluid supply includes a spout with a continuous thread on the exterior thereof, and cooperating internal thread means on the distributor means constructed and arranged to receive the threaded spout in fluid tight relationship therewith.

8. A tree injection closed system as in claim 5 including a valve in the distributor means next to the quick connect-disconnect means for controlling treatment fluid flow through the distributor means.

9. A tree injection closed system as in claim 1 including syringe means for charging the injector with treatment fluid, the syringe means including a hollow chamber having inlet and outlet ends, conduit means for treatment fluid at the outlet end of the hollow chamber, quick connect-disconnect means at the outlet end constructed and arranged for releasable attachment to the quick connect-disconnect shut-off means at the inlet end cap of the injector, and a plunger slidably mounted within the hollow chamber of the syringe means for discharging treatment fluid from the syringe into the injector.

10. A tree injection closed system as in claim 9 including a sealed flexible tube with a premeasured dose of treatment fluid therein arranged to fit within the hollow chamber of the syringe means, and wherein the conduit means includes an inner end protruding inside the hollow chamber for puncturing the flexible tube and thereby establishing treatment fluid flow to the injector when the plunger is depressed into the hollow chamber.

11. A tree injection closed system as in claim 10 wherein the premeasured dose of treatment fluid is 75 milliliters.

12. A tree injection closed system as in claim 10 including a hook-shaped extractor for removing a spent flexible tube from the hollow chamber.

13. A tree injection closed system as in claim 1 wherein the injector tip has an internal passageway and a tapered step-shaped exterior formed by a series of cylindrical surfaces, the diameters of which increase in a direction away from an injector exit orifice, and each cylindrical surface having a common longitudinal axis coinciding with the internal passageway of the injector tip.

14. A tree injection closed system as in claim 1 in combination with a flexible tape for encircling a tree to be injected with treatment fluid, and indicia on the tape for locating injection sites around the circumference of the tree at 4, 6 or 8 inch spacings.

* * * * *